(12) United States Patent
Pilon et al.

(10) Patent No.: US 7,697,558 B2
(45) Date of Patent: Apr. 13, 2010

(54) EMERGENCY ALERT SYSTEM ENHANCEMENT USING ALERT SERVER AND METRO ATM NETWORK FOR DSL DEPLOYMENT

(75) Inventors: Mark Christopher Pilon, Stittsville (CA); Paul James Brown, Wakefield (CA); Gerardo Martin Espinosa, Plano, TX (US); James Gregory McKaig, Ottawa (CA)

(73) Assignee: Alcatel Lucent, Paris (FR)

(*) Notice: Subject to any disclaimer, the term of this patent is extended or adjusted under 35 U.S.C. 154(b) by 468 days.

(21) Appl. No.: 11/717,090

(22) Filed: Mar. 13, 2007

(65) Prior Publication Data

US 2008/0225848 A1 Sep. 18, 2008

(51) Int. Cl.
*H04L 12/56* (2006.01)
*H04J 1/16* (2006.01)

(52) U.S. Cl. .................. 370/430; 370/252; 370/535; 375/220

(58) Field of Classification Search ............... 370/430, 370/252, 535; 375/220
See application file for complete search history.

(56) References Cited

U.S. PATENT DOCUMENTS

| 5,267,232 A | * | 11/1993 | Katsube et al. | 370/230 |
| 7,301,936 B2 | * | 11/2007 | Wan et al. | 370/352 |
| 2005/0141509 A1 | * | 6/2005 | Rabie et al. | 370/395.1 |
| 2006/0015898 A1 | * | 1/2006 | Kim et al. | 725/33 |
| 2006/0161946 A1 | * | 7/2006 | Shin | 725/33 |
| 2007/0136743 A1 | * | 6/2007 | Hasek et al. | 725/33 |
| 2008/0059998 A1 | * | 3/2008 | McClenny et al. | 725/33 |
| 2008/0117075 A1 | * | 5/2008 | Seddigh et al. | 340/825.36 |

* cited by examiner

*Primary Examiner*—John Pezzlo
(74) *Attorney, Agent, or Firm*—Kramer & Amado, P.C.

(57) ABSTRACT

An emergency alert system for alerting DSL subscribers of imminent perils includes an alert server connected over a direct link to an edge node of a metro network for receiving an event notification, configuring from an event notification a highest priority alert message, and broadcasting the alert message to subscriber terminals over the metro network. An Add-Drop Multiplexer (ADM) multiplexes the alert traffic with the regular traffic onto the direct link, and the multiplexed traffic reaches the edge node of the metro network, which is configured with a high priority policy. The edge node discards the lower priority traffic in the presence of the alert traffic and an applet installed on the subscriber terminal accepts and displays the alert message in a browser or a media player.

19 Claims, 4 Drawing Sheets

EMERGENCY ALERT SYSTEM ENHANCEMENT USING ALERT SERVER AND METRO ATM NETWORK FOR DSL DEPLOYMENT

FIELD OF THE INVENTION

The invention is directed to communication networks and in particular to extending the EAS (Emergency Alert System) to customers of a data network.

BACKGROUND OF THE INVENTION

Emergency alert systems have been designed with a view to warn the public of an imminent threat or peril. For example, the AMBER plan (America's missing broadcast emergency response) is used in some countries by the law enforcement agencies to instantly galvanize the entire community to assist in the search and safe return of missing children. Also known are weather alert systems that transmit a special alarm tone over the radio networks with a view to advising about life-threatening situations. These systems are mostly used locally, in areas prone to natural hazards, such as zones of possible incidence of earthquakes, tsunamis, etc.

More complex emergency alert systems are also designed for advising the population of a larger geographical area (e.g. a country) about natural disasters, such as weather related phenomena, earthquakes, volcano activity, or technological hazards, such as chemical releases or oil spills. The idea at the basis of these systems is to minimize the loss of life and injuries. For example, the NOAA weather radio network is a US government service that broadcasts NWS (National Weather Service) warnings, watches, forecasts and other hazard information 24 hours a day from a network of over 600 radio transmitters located throughout a large area, including the mainland US and Puerto Rico, US Virgin Island, and US Pacific territories, etc.

The United States government currently makes use of an emergency alert system, named EAS (Emergency Alert System), which is designed to provide the president a means of addressing the public in the event of a national emergency, within 10 minutes of the need arising. Also, the system is used by local and state officials to broadcast emergency alert information.

However, the EAS is out of date and the FCC (Federal Communications Commission) has put forward proposal FCC 05-191, which is requesting the government, FCC and industry vendors to improve and update it. The goal is to include more popular user devices, since the existing EAS has support only for analog TV, analog radio, wireless cable, and wire line cable systems. There is a concern that a large number of people are moving away from these systems, which decreases the effectiveness of the EAS.

In October 2005, the FCC expanded its EAS requirements to include participation by digital television (DTV) broadcasters, digital cable television providers, digital broadcast radio, digital audio radio service (DARS) and direct broadcast satellite (DBS) systems. All requirements except the DBS requirement were to be implemented by Dec. 31, 2006. The DBS requirement is to be implemented by May 31, 2007. There have been indications that other target devices such as cell phone, PDA's and the Internet must be supported by the EAS. However, currently there are no requirements for EAS to support end user devices which are connected to the Internet via a digital subscriber line (DSL) modem.

There are other alert systems that broadcast notifications of various events to end user devices connected to the Internet; "Yahoo Alerts" is an example of such a notification system. However, these web alert systems are not reliable because they are not controlled by a centralized organization with first hand information about the respective event (are not part of the EAS). In addition, the existing systems likely have no influence on the telecommunications network that would carry the alert message to the end user; congestion in the Internet can prevent notifications from being delivered to an end user in a timely fashion. It is very unlikely that a web server owner could buy a service level agreement from a service provider, or carrier that would guarantee transport to all possible end DSL subscribers.

Due to the high number of DSL subscribers and the amount of time users spend using Internet services, it is possible that during a national, state, or local emergency, these users may not be notified of critical information. There is a need to specifically address the lack of EAS support for Internet end user devices, such as PCs.

To provide a reliable web alert system, the owner of the network must configure the network to give a guaranteed quality of service (QoS) such that alert messages are guaranteed to get to the end user device. There is a need to provide a reliable web alert system that uses an alert server strategically placed in a selected location in the network, such that the network can realistically be engineered to provide needed QoS for the alert messages.

SUMMARY OF THE INVENTION

It is an object of the invention to extend the current EAS for enabling dissemination of alert messages to DSL subscribers in a reliable and timely fashion.

A further object of the invention is to preempt regular low priority traffic, such as for example the traffic resulting from users surfing the Internet, with high priority alert traffic.

It is another object of the invention to provide EAS support to subscribers that are connected to the Internet via a digital subscriber line access multiplexer (DSLAM) that connects to an ATM metro network, to gain access to an Internet service provider (ISP).

Accordingly, the invention provides an emergency alert system for alerting DSL subscribers of imminent perils, where subscriber terminals are connected over a digital subscriber line access multiplexer (DSLAM) to a metro network for carrying regular traffic between the subscriber terminals and the Internet, comprising: an alert server connected over a direct link to an edge node of the metro network for configuring from an event notification a highest priority alert message, and broadcasting the alert message to the subscriber terminals over the metro network; an add multiplexer (ADM) for multiplexing alert traffic including the alert message with the regular traffic onto the link; and an applet installed on the subscriber terminal for accepting the alert message and displaying the alert message in a browser or a media player, wherein the alert message travels between the alert server to the edge node over the direct link and between the edge node and the DSLAM on a virtual circuit.

The invention also provides a method for alerting DSL subscribers of imminent perils, where subscriber terminals are connected via a digital subscriber line access multiplexer (DSLAM) to a metro network for carrying regular traffic between the subscriber terminals and the Internet, the method comprising the steps of: a) generating at an alert server an alert message configured with a high priority policy; b) providing a direct link between the alert server and an edge node of the metro network for broadcasting the alert message to the edge node; c) transporting alert traffic including the alert message and the regular traffic from the edge node to the DSLAM over a virtual circuit established within the metro network, while enforcing the high priority policy at the edge node; and e) distributing the alert message from the DSLAM to the subscriber terminals for displaying the alert message in a browser or a media player at the subscriber terminals.

According to a further aspect of the invention, an alert server is connected to an edge node of a metro network which carries regular traffic between subscriber terminals and the Internet. The alert server comprises a database for storing alert definition information, where alert messages are mapped to event notifications; an event notification interface for receiving alert notifications from trusted alert notification sources and identifying in the database alert messages corresponding to the respective event notifications; a scheduler for maintaining an alert priority list, and scheduling broadcast of alert messages identified by the event notification interface based on the alerts priority; and a network interface for configuring the alert message received from the scheduler into a highest priority alert message.

Advantageously, the system of the invention may satisfy a future need of the EAS of the United States, or of other national and global alert system by allowing national, state and local emergency broadcast messages to be displayed on DSL subscriber end user devices in a reliable and timely fashion.

The system of the invention assists agencies in preparing for emergency situations. Alert broadcast messages can be pre-defined in a language of interest, recorded and stored for use as and when needed. This could save time when the alert message needs to be broadcast when the appropriate pre-defined alert message is broadcast automatically or upon a user request. In addition, the persons otherwise needed to create the alert message do not need to be around at the time the alert needs to be broadcast.

The solution provided by the invention adds an extra layer of protection to the existing EAS. Inclusion of DSL Internet access in the distribution of the alert messages increases the avenues of which to deliver a message to the public. For example, if infrastructure of Radio, or Cable TV damage during an emergency event, the reliable DSL infrastructure may be an extremely effective means or reaching people.

Another advantage of the invention is that it leverages the installed base of DSLAM and ATM nodes, which are currently used to provide internet access to DSL subscribers. It is to be noted that the solution proposed by the invention is applicable not only to DSL subscribers; for example, one could use an alert server to send messages over an IP/MPLS network that was traffic engineered to provide guaranteed delivery of the alert messages, using again a strategic placement of the alert server. Furthermore, this invention is particularly advantageous for the DSL subscribers, since a DSL connection from the home to DSLAM inherently provides a guaranteed bandwidth (cable modem connections do not guarantee the bandwidth). As well, the invention takes advantage of existing VCC (virtual channel connection) infrastructure.

It is also to be noted that the solution proposed by this invention is applicable to many other countries/territories with a high availability of Internet services.

BRIEF DESCRIPTION OF THE DRAWINGS

The foregoing and other objects, features and advantages of the invention will be apparent from the following more particular description of the preferred embodiments, as illustrated in the appended drawings, where.

DETAILED DESCRIPTION

Figure 1:
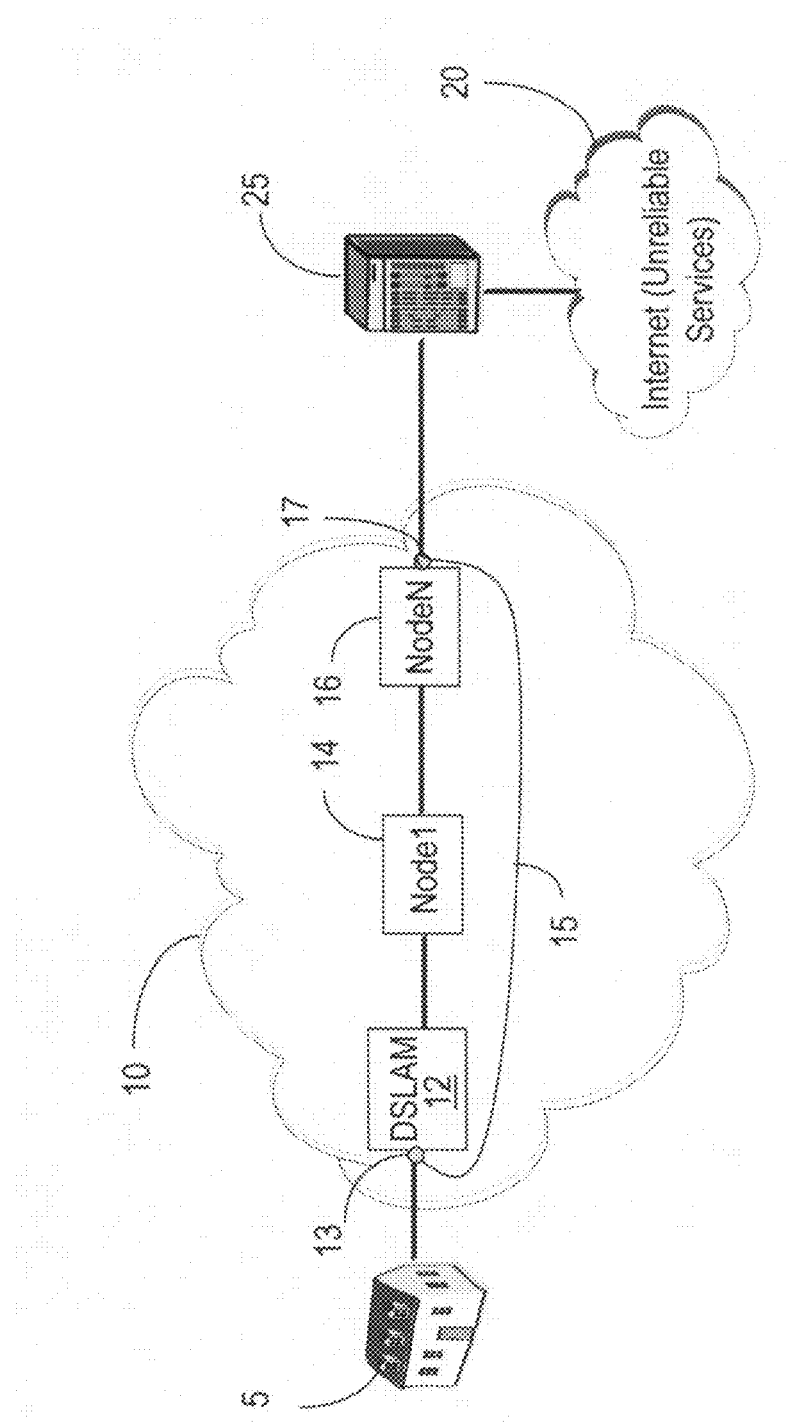
FIG. 1 illustrates a simplified view of the network architecture used currently for providing Internet access to DSL subscribers.

FIG. 1 illustrates a simplified view of a network architecture used currently for providing DSL subscribers 5 (shown intuitively as a home), access to Internet 20. In most architectures used today, this is implemented over a metro network 10. For example, AT&T uses an ATM metro network for providing Internet access in an architecture as shown in FIG. 1. The connection of subscriber 5 to network 10 is accomplished by connecting a residential DSL modem at the customer premises (not shown) to a DSLAM 12. It is to be noted that device 12 used for access to network 10 may vary from customer to customer, for example, some may use Alcatel DSLAM's, others may use $3^{rd}$ party DSLAMs, but the network architecture shown in FIG. 1 is generally used by all.

In the architecture of FIG. 1, the residential DSL modem is connected to a DSLAM port denoted with 13, which in turn is physically connected to an edge node 14 of metro network 10. Network 10 comprises a plurality of network nodes (or network elements); only two edge nodes 14, 16 are shown in FIG. 1 for simplicity, and as these two nodes are relevant to the invention. A virtual circuit 15 connects port 13 on DSLAM 12 with the port 17 on the far-end edge node 16. Metro network 10 is in many cases an ATM network, in which case nodes 14 and 16 are equipped with ATM switches (e.g. Alcatel's 7470 MSP switches), and port 13 may be cross-connected to a VPI/VCI in this network on a T3 ATM link.

The VCC path within the ATM metro network is typically configured with a Unspecified Bit Rate (UBR) service category and with a minimum information rate (MIR) value of 40 kb/s. This is the case for approximately 292,000 VCC paths used to provide DSL service within for example the current AT&T (SBC) network. The fact that the service category is UBR is part of the problem when alert messaging services are to be provided to DSL subscribers: UBR is a best effort service, and this means there is no guarantees for timely delivery of alert messages.

On the Internet side of the system, port 17 of NE 16 at the edge of the metro network 10 is connected to a broadband remote access server (BRAS) 25, which provides access to Internet 20. This connection could be for example an OC3. With this connectivity, regular traffic between the DSL subscribers 5 and the Internet 20 travels bi-directionally along connections established via the DSLAM 12 that connects to BRAS 25 over virtual circuit 15 established in network 10.

Figure 2:
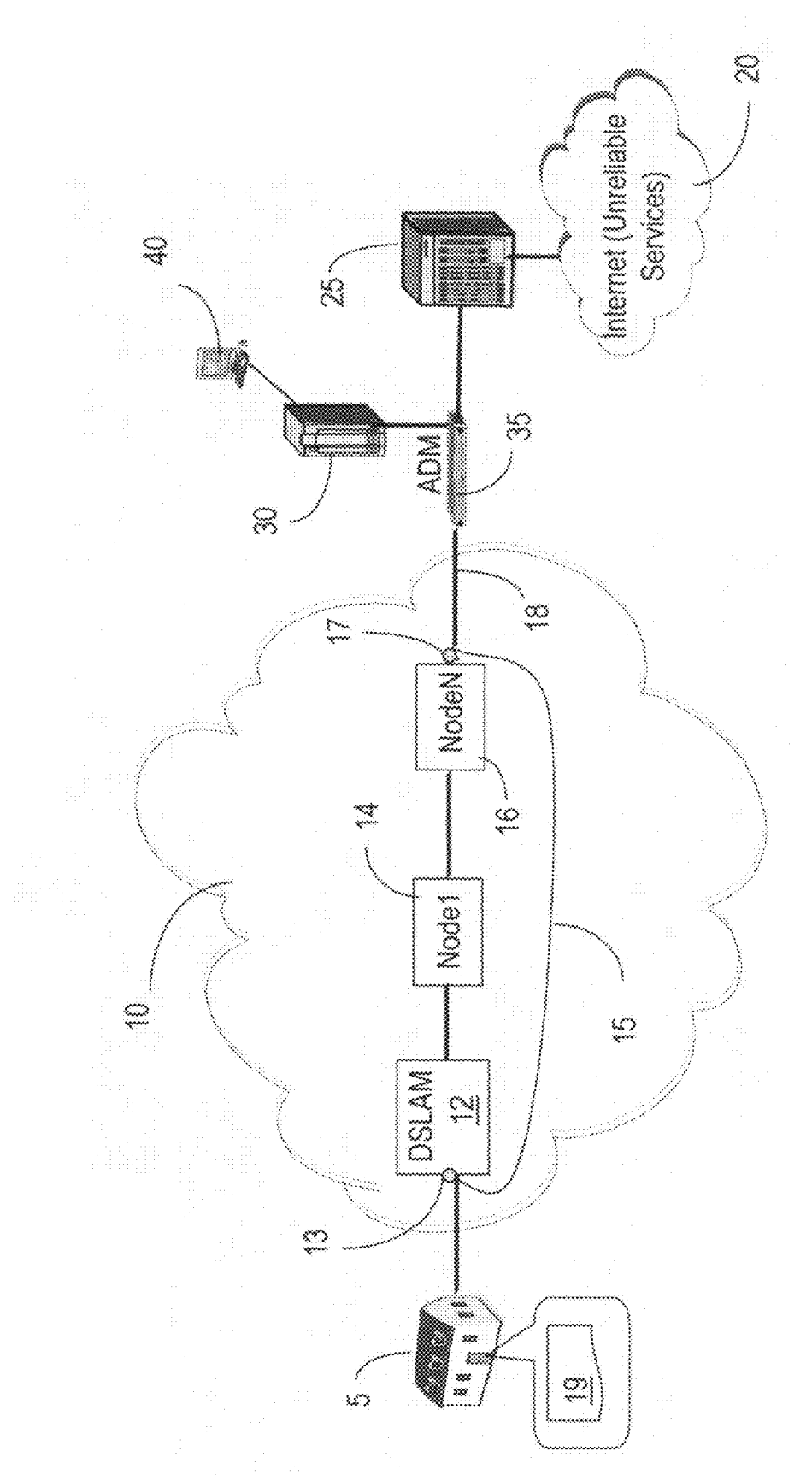
FIG. 2 shows the network architecture according to an embodiment of the invention.

The present invention enables providing the end-users 5 with alerts messages issued, for example, by the EAS or other alert systems of a similar caliber, with minor changes to a system architecture shown in FIG. 1. A preferred embodiment of the system according to the invention is shown in FIG. 2. It includes a web server 30, referred to as an alert server, a multiplexing device 35 and a simple application 19 that runs on the end user device, which accepts alert messages from the alert server 30 and displays them in a browser or media player.

The alert server 30 could be a UNIX machine, or a PC, configured with a network interface (i.e. an ATM network interface when network 10 is an ATM network), on the side of metro network 10. The interface configures the alert message with the highest priority and preferably, the edge node 16 is configured to apply a high priority policy recognized in the metro network to the traffic it receives. In this way, the system reliably delivers any alert message received from all event notification sources, registered with the alert server 30, to the DSL end user device. FIG. 2 shows only one event notification source 40 for simplicity; event notification sources of various types (for meteorological alerts, earthquakes, chemical and biological attacks, important political and social events, etc.) may be registered with the alert server with a view to provide alerts for as many perils, threats or important events as possible.

As indicated above, the alert server broadcasts short alert messages marked with the highest priority available for the respective protocol. For example, in the case of an ATM metro network, ATM cell header indicates two levels of priority for ATM cells: CLP=0 cells are higher priority than CLP=1 cells. The alert server in this case will configure the ATM cells with a CLP of 0 and CLP=1 cells may be discarded during periods of congestion to preserve the cell loss ratio of CLP=0 cells. The server is also configured to allow management and broadcast of predefined alerts, as well as, broadcast of audio or video messages.

The alert traffic with the alert messages from the alert server 30 is multiplexed with the regular traffic connecting the Internet service provider network to metro network 10 onto a direct link 18 (e.g. a physical cable). This configuration change is easy to implement in the current DSL's, by using add multiplexer (ADM) 35. ADM 35 may also perform admission control. In such a case, the add multiplexer device 35 could be a common DSL (Digital Subscriber Loop) modified so as to allow reliable and timely transport of alert messages by preempting lower priority internet traffic.

Preferably, edge node 16 performs the admission control functionality and traffic policing. Therefore, the VCCs between the edge node 16 and DSLAM 12 are configured with a policing configuration to allow the dropping of low priority traffic on node 16. In such an arrangement, for the case of an ATM metro network 10, both CLP=0 and CLP=1 ATM cells arrive at node 16, and node 16 drops the CLP=1 traffic in the presence of CLP=0 cells. Enough bandwidth is provided on the direct link 18 between ADM 35 and node 16 to ensure that the alert server traffic and the regular traffic reach node 16.

Each aggregation port 17 on the edge network element 16 is the termination point for many DSL subscriber VCCs. For example, the section of the AT&T network this example network is based on, has 15,000 VCC paths terminating on such a port. The alert server 30 broadcast the alert messages on all VCCs established on the respective port 17.

The system of the invention operates as follows:

Event notification source 40, trusted by the alert server, provides the alert server 30 with an event notification.

The alert server 30 broadcasts an alert message on all aggregation ports 17 on an edge node 16 of the metro network it is connected to.

The alert message safely arrives to the metro network edge node 16 as highest priority traffic.

The edge node 16 discards all low priority traffic and admits only the highest priority traffic, in this case the alert traffic. The alert message is broadcast on all VPI/VCI associated with the DSL subscribers of which this alert server is responsible for.

The metro network 10 delivers the alert messages to DSL end users devices 5.

Figure 3:
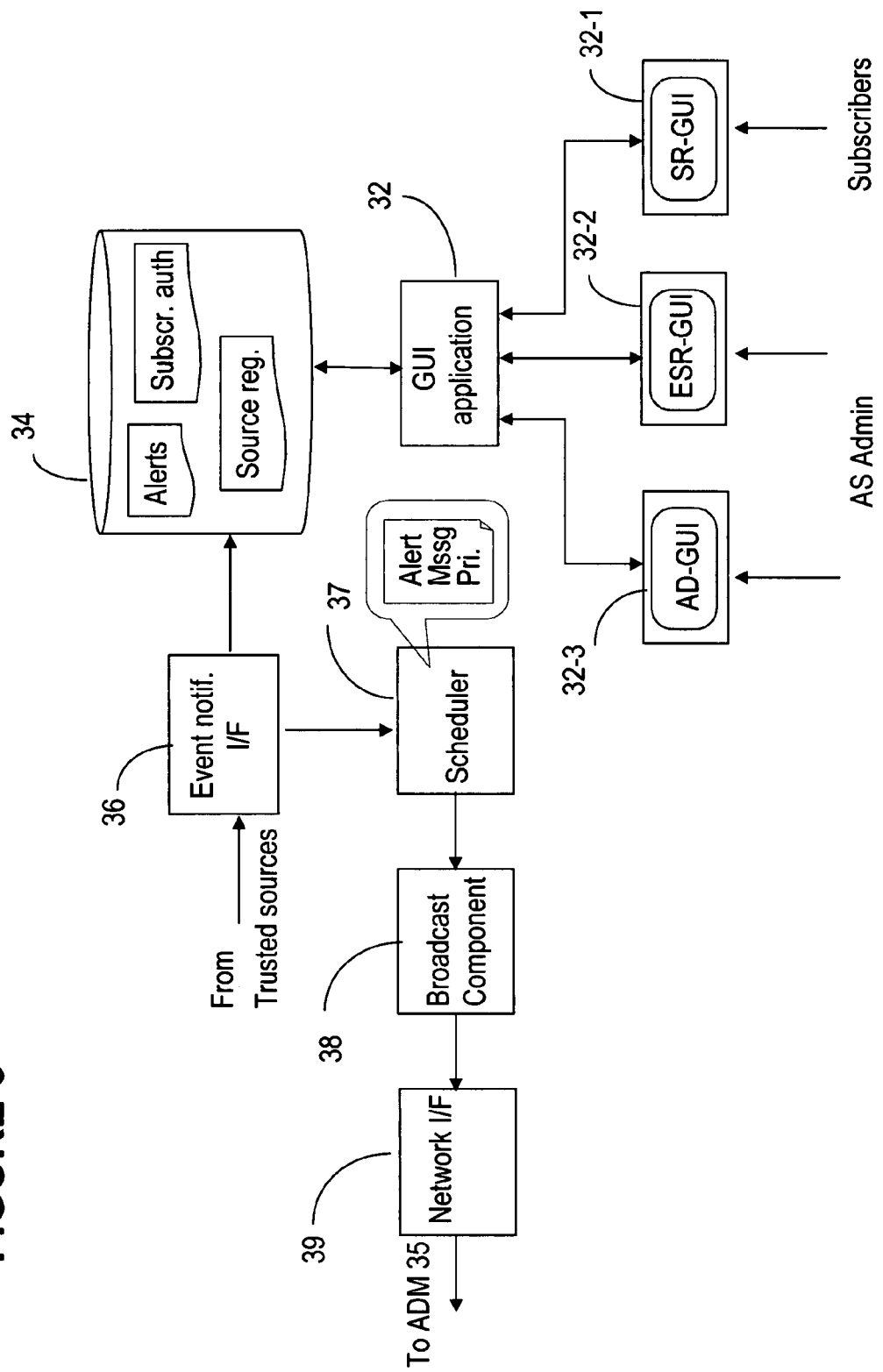
FIG. 3 is a block diagram of the alert server.

The alert server 30 can take many forms and can be enabled with various features; an embodiment is illustrated in FIG. 3. Alert server 30 shown in this figure comprises a database 34, an event notification interface 36, a broadcast scheduler 37, a network interface 38 and a broadcast component 39. The alert server 30 is also provided with a graphical user interface application 32 configured for enabling user or administrator interaction with the alert system. FIG. 3 illustrates intuitively three such GUIs, namely a subscriber registration GUI 32-1, an alert source registration GUI 32-2 and an alert definitions GUI 32-3, however, other GUIs may be provided as and if needed.

The network interface 39 configures the alert traffic with highest priority according to the protocol used by the metro network, in order to allow the edge node 16 to discard the lower priority Internet traffic if required, and to ensure the alert broadcast is transported to the end DSL subscriber. As indicated above, in case of an ATM network 10, network interface 39 is an ATM network interface card (NIC) which configures the ATM cells with the highest priority (CLP=0). For example, an alert server running on a Sun V240 station, which is using the Solaris UNIX operating system, could use as NIC 38 an Interphase iSPAN 5576 PCI ATM Over OC3/STM1 card. Such a card 38 provides an API (Application Programming Interface) that allows an administrator/programmer to control the internal queuing priority, and modify the CLP bit in the ATM cell for data transmitted on given VPI/VCIs. An example function that an application programmer can call from the API of an ATM NIC 39 in order to set the CLP bit priority is the isar_vc_send function, which modifies the internal queuing priority and ATM cell CLP bit while transmitting cells.

The broadcast component 38 performs the broadcast of a given alert message. It is not in the scope of this invention to define the algorithm used to broadcast an alert message, but for an example's sake, let's assume the logic would exist in the broadcast component 38 of the alert server 30 that transmits the alert message on every possible VPI/VCI. It is critical to this invention that the broadcast component 38 uses the API of the ATM network interface card 39 to ensure that all ATM cells transmitted for the alert broadcast set CLP=0, i.e. highest priority traffic.

The event notification interface 36 allows registered event notification sources to send event notifications, and requests an alert broadcast to be sent by the alert server. This component also accesses the alert definition information in database 34 with a view to map the respective event notifications to the corresponding alert message and provides the appropriate alert message to the scheduler 37, for triggering broadcast of the respective alert message.

The broadcast scheduler 37 maintains a list with alert message priorities. Upon receipt of an alert message from the event notification interface 36, this component main function is to schedule broadcast of alert messages in a queue according to their priority. The scheduler also drops incoming alert messages that correspond to an alert broadcast which has already been scheduled, or has been broadcast. This is required as multiple event sources may report the same event.

FIG. 3 also shows the GUIs available at the alert server 30. The subscriber registration GUI 32-1 provides the end users with a form that allows users registration for alert notifications. This authenticated alert subscriber information is referred to here as subscriber information. Upon registration, the applet (application) 19 is installed on the subscriber terminal 5. This applet is always running in the background at all times. The purpose of this applet is to receive broadcast messages from the alert server 30. Upon receiving an alert message, the client side application 19 pops up and displays the content of the alert message.

Alert source registration GUI 32-2 provides a form that allows trusted event source entities 40 to register with the alert server 30. For example, the National Weather Service of the United States may wish to act as an event notification source to trigger the sending of an alert broadcasts based on weather conditions. To this end, the National Weather Service would register with the alert server via the alert source registration GUI. This authenticated source registration information is referred to here as event notification source information.

Alert definition GUI 32-3 provides a form which allows the administrator of the alert server, or authenticated alert sources, to define the content of the alerts and the events that shall trigger the broadcast. There are likely to be many configuration rules enforced by this GUI to ensure all alert definitions conform to a standard. For example, it may be a requirement that an alert broadcast message requires less than 40 kb/s of network bandwidth. This data is referred to as alert definition information, and it represents the alert messages to be broadcast. These could be a static pop up style web page, an audio, or a video message.

As indicated above, the preferred embodiment of the invention uses a metro ATM network, which is currently the configuration of choice for the service providers. The ATM network 10 requires some configuration changes to ensure reliable and timely delivery of the alert messages, or emergency broadcast. The network configuration change requires: (1) changing service category of the traffic to nrt-VBR; and (2) enabling policing (discard) on the respective paths, as described in further detail next.

Service Category Change

By changing the VCC path to use nrt-VBR instead of UBR, a specified throughput capacity is guaranteed on this connection. For example, with a nrt-VBR service category, a bandwidth of 40 kb/s, which can be guaranteed across the metro ATM network 10 for each VCC. This is true because the VCCs are originally configured with a MIR of 40 kb/s and a PIR (Peak Information Rate) of 384 kb/s. By changing the service category to nrt-VBR the call now has a SIR (Sustained Information Rate) of 40 kb/s (SIR) and a PIR (Peak Information Rate) of 384 kb/s.

It may seem odd to resize the VCC to nrt-VBR with an SIR of 40 kb/s to guarantee bandwidth, rather than just change the service category to CBR and specify only a large CIR, or use nrt-VBR but specify a much higher value for SIR. The reason nrt-VBR with a SIR of 40 kb/s is used, is because, more likely, the metro ATM network is overbooked: carriers are trying to use as little network bandwidth as possible, relying on the fact not all DSL users are online at the same time. Keeping the SIR as the same value as the UBR's MIR has the least impact on the metro network resources, but still provides sufficient guaranteed bandwidth to allow the alert message to be delivered.

Enabling Policing (Discard) on the Path

The second configuration change in the metro network is to enable traffic policing on each VCC path. As the Alert Server broadcasts messages as the highest priority (e.g. for ATM traffic, CLP=0 in the ATM cell) this high priority traffic arrives at the broadband remote access server (BRAS) 16 along with normal lower priority ATM traffic, which carries regular Internet traffic. Now, the edge ATM node 16 connecting to the BRAS 25 has both highest priority and lowest priority traffic attempting to "get on" the VCC. By enabling traffic policing, the switch 16 will discard lowest priority traffic (CLP=1 cells) as needed such that the alert message (CLP=0 cells) is admitted to the metro network 10 for transport to the subscribers 5.

As indicated above, each aggregation port 17 on the network element 16 is the termination point for many DSL subscriber VCC paths (e.g. 15,000 VCC paths may terminate on such a port). This is important since the location of the alert servers within the network would be influence by this. One could deploy one alert server 30 per metro area, as shown in FIG. 2. Another possibility is to have one centralized Alert Server for the entire network, but this would require connecting VCC calls between the alert server and each metro network segment (geographic area). If this is done the VCCs from the alert server must guarantee the transport of the alert message.

Figure 4:
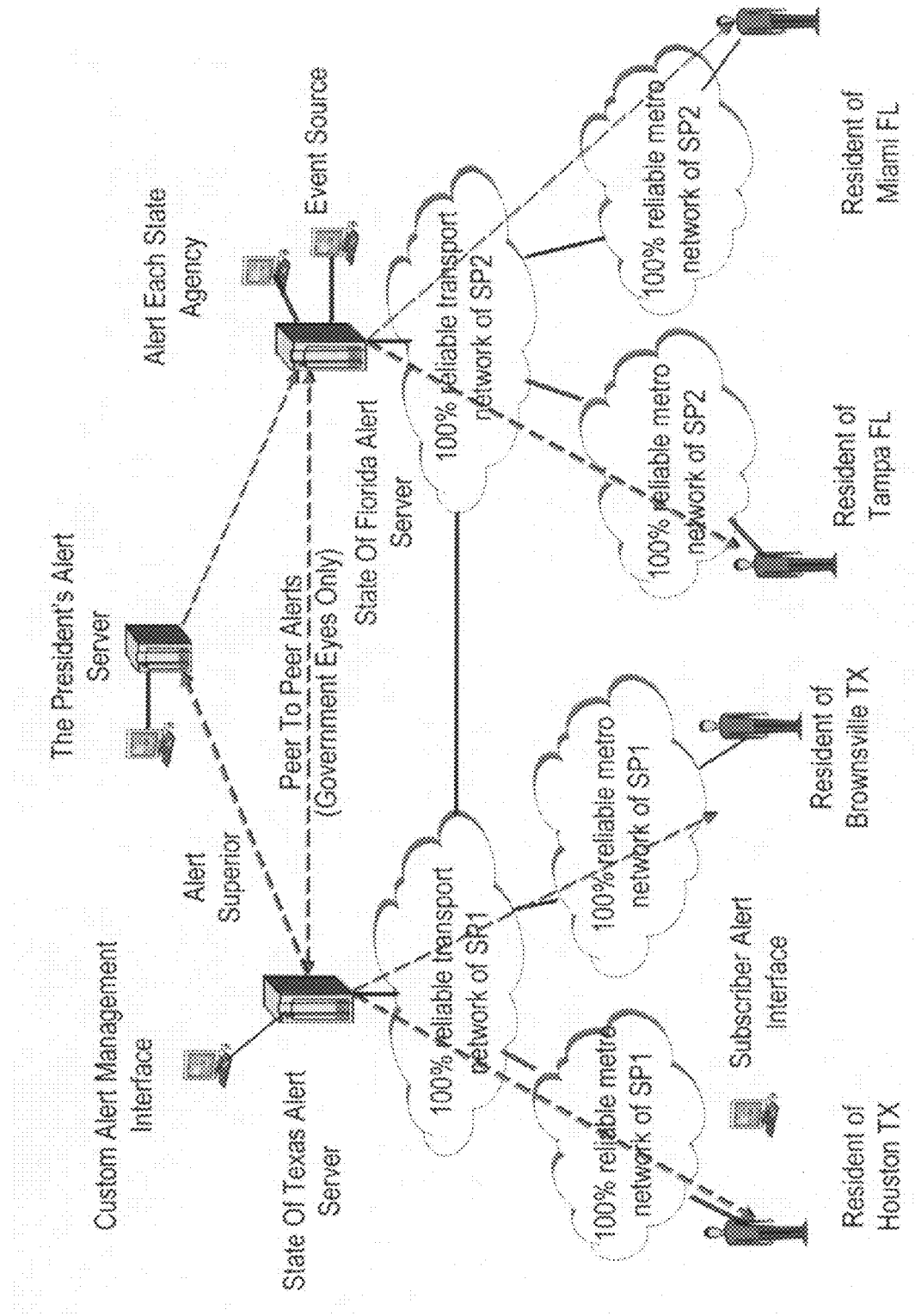
FIG. 4 illustrates an application of the solution according to the invention.

FIG. 4 shows an application (example) of the solution according to the invention, illustrating multiple alert servers in a peer or parent child relationship. In this configuration, each alert server may act as an event notification source, i.e. request another alert server to send a broadcast message, or may act just as a broadcast server.

We claim:

1. An emergency alert system that alerts Digital Subscriber Line (DSL) subscribers of imminent perils, where subscriber terminals are connected over a digital subscriber line access multiplexer (DSLAM) to a metro network that carries regular traffic between said subscriber terminals and the Internet, comprising:

an alert server directly connected over a direct link to an edge node of said metro network that receives an event notification, configures from said event notification a highest priority alert message, and broadcasts said alert message to said subscriber terminals over said metro network;

an Add-Drop Multiplexer (ADM) that multiplexes alert traffic including said alert message with said regular traffic onto said direct link, wherein a specified throughput capacity is guaranteed for the alert message and the alert message preempts the regular traffic having a lower priority; and an applet installed on said subscriber terminals that accepts said alert message and displays said alert message in a browser or a media player, wherein said alert message travels between said alert server to said edge node over said direct link and between said edge node and said DSLAM on a virtual circuit.

2. The emergency alert system of claim 1, further comprising:

one or more event notification sources, wherein each source transmits event notifications of various types to said alert server, upon registration with said alert server.

3. The emergency alert system of claim 1, wherein said alert message is any of an audio alert message, a video alert message, a text message and any combination thereof.

4. The emergency alert system of claim 1, wherein when said metro network is an Asynchronous Transfer Mode (ATM) network, equipped with an ATM network interface which configures all ATM cells transporting said alert message with a Cell Loss Priority (CLP) bit of zero.

5. The emergency system of claim 4, wherein said virtual circuit carries a plurality of Virtual Path Identifier/Virtual Circuit Identifier (VPI/VCI) fields that transmit said regular traffic and said alert traffic to DSL subscribers registered at said alert server, and the alert server broadcasts said alert traffic on each said VPI/VCI field.

6. The emergency system of claim 5, further comprising:

configuring each said VPI/VCI field with a Variable Bit Rate non real time (nrt-VBR) service category for guaranteeing the specified throughput capacity for said alert traffic.

7. A method of alerting Digital Subscriber Line (DSL) subscribers of imminent perils, where subscriber terminals are connected via a digital subscriber line access multiplexer (DSLAM) to a metro network to carry regular traffic between said subscriber terminals and the Internet, said method comprising the steps of:

generating at an alert server an alert message configured with a high priority policy;

providing a direct link between said alert server and an edge node of said metro network to broadcast said alert message to said edge node;

transporting alert traffic including said alert message and said regular traffic from said edge node to said DSLAM over a virtual circuit established within said metro network, while enforcing said high priority policy at said edge node so that the alert message preempts the regular traffic having a lower priority, wherein a specified throughput capacity is guaranteed for the alert message; and distributing said alert message from said DSLAM to said subscriber terminals to display said alert message in a browser or a media player at said subscriber terminals.

8. The method of claim 7, wherein the providing step comprises:

receiving an event notification at said alert server from an event notification source and converting said event notification into said alert message.

9. The method of claim 7, wherein said direct link provides the bandwidth necessary to carry both said alert traffic and the regular traffic.

10. The method of claim 9, wherein, when said metro network is an Asynchronous Transfer Mode (ATM) network, the providing step comprises:

configuring ATM cells transporting said alert message with a Cell Loss Priority (CLP) bit of zero.

11. The method of claim 10, wherein the transporting step comprises:

configuring said virtual circuit for carrying ATM cells within a plurality of Virtual Path Identifier/Virtual Circuit Identifier (VPI/VCI) fields for carrying said regular traffic to DSL subscribers; and broadcasting said alert message on each said VPI/VCI field registered at said alert server.

12. The method of claim 7, wherein the generating step comprises, at said alert server:

registering said subscriber terminals for receiving said alert messages based on said registration;

registering a plurality of trusted event notification sources for receiving said event notifications therefrom; and providing alert definitions for generating specific, configurable alert messages for different types of event notifications.

13. An alert server that alerts Digital Subscriber Line (DSL) subscribers of imminent perils, said alert server being connected to an edge node of a metro network which carries regular traffic between subscriber terminals and the Internet, comprising:

a database that stores alert definition information, where alert messages are mapped to event notifications;

an event notification interface that receives alert notifications from trusted alert notification sources and identifies in said database alert messages corresponding to the respective event notifications;

a scheduler that maintains a list with alert message priorities and schedules broadcast of alert messages identified by said event notification interface based on said alerts priority; and a network interface that configures said alert message received from said scheduler into a highest priority alert message, wherein a specified throughput capacity is guaranteed for the alert message and the alert message preempts regular traffic having a lower priority.

14. The alert server of claim 13, further comprising:

a broadcast component that transmits said highest priority alert message as alert traffic on all connections established in said metro network between said alert server and said subscriber terminals.

15. The alert server of claim 13, wherein when said metro network is an ATM metro network, said network interface configures all ATM cells transporting said alert message with a Cell Loss Priority (CLP) bit of zero.

16. The alert server of claim 13, wherein said database further comprises subscriber information and event notification source information.

17. The alert server of claim 16, further comprising:

a graphical user interface (GUI) application that enables an administrator of said alert server to input said event notification source information and alert definition information into said database.

18. The alert server of claim 16, further comprising:

a graphical user interface (GUI) application that enables DSL subscribers to register for receiving said alert message from said alert server, by inputting said subscriber information into said database.

19. The alert server of claim 16, wherein said event notification interface discards any subsequent event notification relating to an imminent peril for which an event notification has been already received.

* * * * *